US012804764B2

(12) United States Patent
Zorgui et al.

(10) Patent No.: US 12,804,764 B2
(45) Date of Patent: Nov. 17, 2026

(54) RETRANSMISSION MONITORING ADAPTATION UNDER DISCONTINUOUS CONFIGURATIONS

(71) Applicant: QUALCOMM Incorporated, San Diego, CA (US)

(72) Inventors: Marwen Zorgui, San Diego, CA (US); Ahmed Elshafie, San Diego, CA (US); Diana Maamari, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 18/181,874

(22) Filed: Mar. 10, 2023

(65) Prior Publication Data

US 2024/0306245 A1 Sep. 12, 2024

(51) Int. Cl.
*H04W 76/28* (2018.01)
*H04L 1/08* (2006.01)

(52) U.S. Cl.
CPC ............... *H04W 76/28* (2018.02); *H04L 1/08* (2013.01)

(58) Field of Classification Search
None
See application file for complete search history.

(56) References Cited

U.S. PATENT DOCUMENTS 11,979,831 B2* 5/2024 Kim ...................... H04W 76/28
12,127,128 B2* 10/2024 Guan .................... H04L 5/0023
2008/0198795 A1* 8/2008 Kim ...................... H04W 72/21 370/328
2009/0168731 A1* 7/2009 Zhang ................... H04L 1/1854 370/336
2012/0275366 A1* 11/2012 Anderson ......... H04W 52/0219 370/311
2013/0094379 A1* 4/2013 Xu .................... H04W 52/0209 370/252
2017/0251519 A1* 8/2017 Ohlsson ................ H04W 72/21
(Continued)

FOREIGN PATENT DOCUMENTS

WO WO-2023019074 A1 * 2/2023 ............ H04W 76/28
WO WO-2024065329 A1 * 4/2024
WO WO-2024158481 A1 * 8/2024 ........ H04W 52/0206

OTHER PUBLICATIONS

Gapeyenko M (Nokia)., et al., "XR-Specific Power Saving Enhancements", 3GPP TSG RAN WG1 #111, R1-2211551, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 7, 2022, 14 Pages, XP052222115, Paragraph [0002]-Paragraph [0003].
(Continued)

*Primary Examiner* — Kodzovi Acolatse
(74) *Attorney, Agent, or Firm* — Patterson & Sheridan LLP

(57) ABSTRACT

Certain aspects of the present disclosure provide techniques for wireless communication by a user-equipment (UE), comprising determining that a cell discontinuous communication cycle does not align with a transmission configuration for a transmission to or from a network entity, and processing the transmission, based on at least one rule that adjusts at least one of the cell discontinuous communication cycle or the transmission configuration, in response to the determination.

30 Claims, 13 Drawing Sheets

(56) References Cited

U.S. PATENT DOCUMENTS

| | | | | |
|---|---|---|---|---|
| 2020/0053824 | A1 | 2/2020 | He | |
| 2020/0120744 | A1* | 4/2020 | Medina Acosta | H04W 72/0446 |
| 2020/0229092 | A1* | 7/2020 | Wu | H04W 76/28 |
| 2021/0059004 | A1* | 2/2021 | Wu | H04W 72/569 |
| 2023/0051778 | A1* | 2/2023 | Lee | H04W 52/0216 |
| 2023/0065594 | A1* | 3/2023 | Chan | H04W 28/10 |
| 2023/0127658 | A1* | 4/2023 | Li | H04W 72/23 370/329 |
| 2023/0413018 | A1* | 12/2023 | Liu | H04W 52/0216 |
| 2024/0147574 | A1* | 5/2024 | Karampatsis | H04W 4/06 |
| 2024/0224376 | A1* | 7/2024 | Yang | H04W 52/0216 |
| 2024/0237135 | A1* | 7/2024 | Wu | H04W 76/28 |

OTHER PUBLICATIONS

International Search Report and Written Opinion—PCT/US2024/014340—ISA/EPO—May 7, 2024.

* cited by examiner

RETRANSMISSION MONITORING ADAPTATION UNDER DISCONTINUOUS CONFIGURATIONS

BACKGROUND

Field of the Disclosure

Aspects of the present disclosure relate to wireless communications, and more particularly, to techniques for wireless transmission configuration alignment during a discontinuous communication cycle.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user-equipment (UE). The method includes determining that a cell discontinuous communication cycle does not align with a transmission configuration for a transmission to or from a network entity; and processing the transmission, based on at least one rule that adjusts at least one of the cell discontinuous communication cycle or the transmission configuration, in response to the determination.

Another aspect provides a method for wireless communication by a network entity. The method includes determining that a cell discontinuous communication cycle does not align with a transmission configuration for a transmission to or from a UE; and processing the transmission, based on at least one rule that adjusts at least one of the cell discontinuous communication cycle or the transmission configuration, in response to the determination.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for aligning wireless transmissions during a discontinuous communication cycle.

To reduce power consumption, a network entity (e.g., base station (BS) or gNB) or a UE may be configured for some type of discontinuous communications. As used herein, discontinuous communications may refer to a mode where transmissions from or reception by a particular device is unavailable. For example, a UE may be configured for a discontinuous reception (DRX) mode, during which the UE is may enter a low power state because it does not need to monitor for downlink transmissions. Similarly, in a discontinuous transmission (DTX) mode, a network may not transmit and may conserve power.

In some cases, certain transmission configurations may be impacted by DTX/DRX inactive modes. As used herein, the term transmission configuration generally refers to a configuration that dictates when certain transmissions or retransmissions may be expected. Thus, having knowledge of a transmission configuration may allow a transmitter to know when a receiver is expecting (and monitoring for) a transmission. For example, as will be described in greater detail below, in some cases, such configurations may dictate that a UE should monitor for certain transmissions, even when the network is in a non-Active state. This may result in a waste of power if the UE continues to monitor for a downlink transmission and may also result in latency, increasing timelines.

Aspects of the present disclosure, however, may help address this issue by providing rules designed to align DTX/DRX cycles with uplink/downlink transmission configurations. The rules may help define UE and network-side behavior, for example, to extend DTX/DRX cycles and/or adjust periods when a UE monitors for transmissions. Aligning DTX/DRX cycles with uplink/downlink transmission configurations in this manner may help reduce unnecessary monitoring by the UE, help conserve power, and reduce latency.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
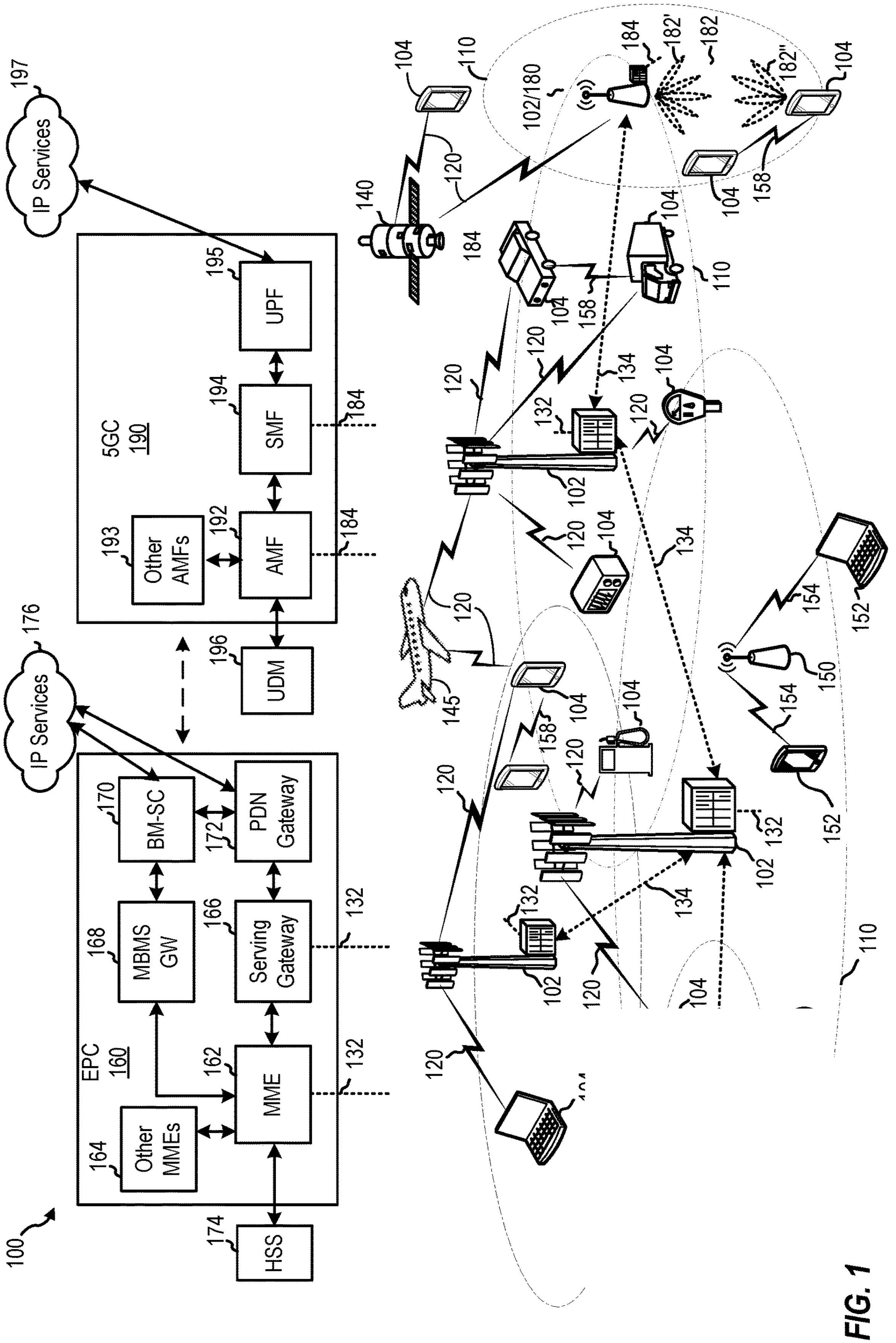
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
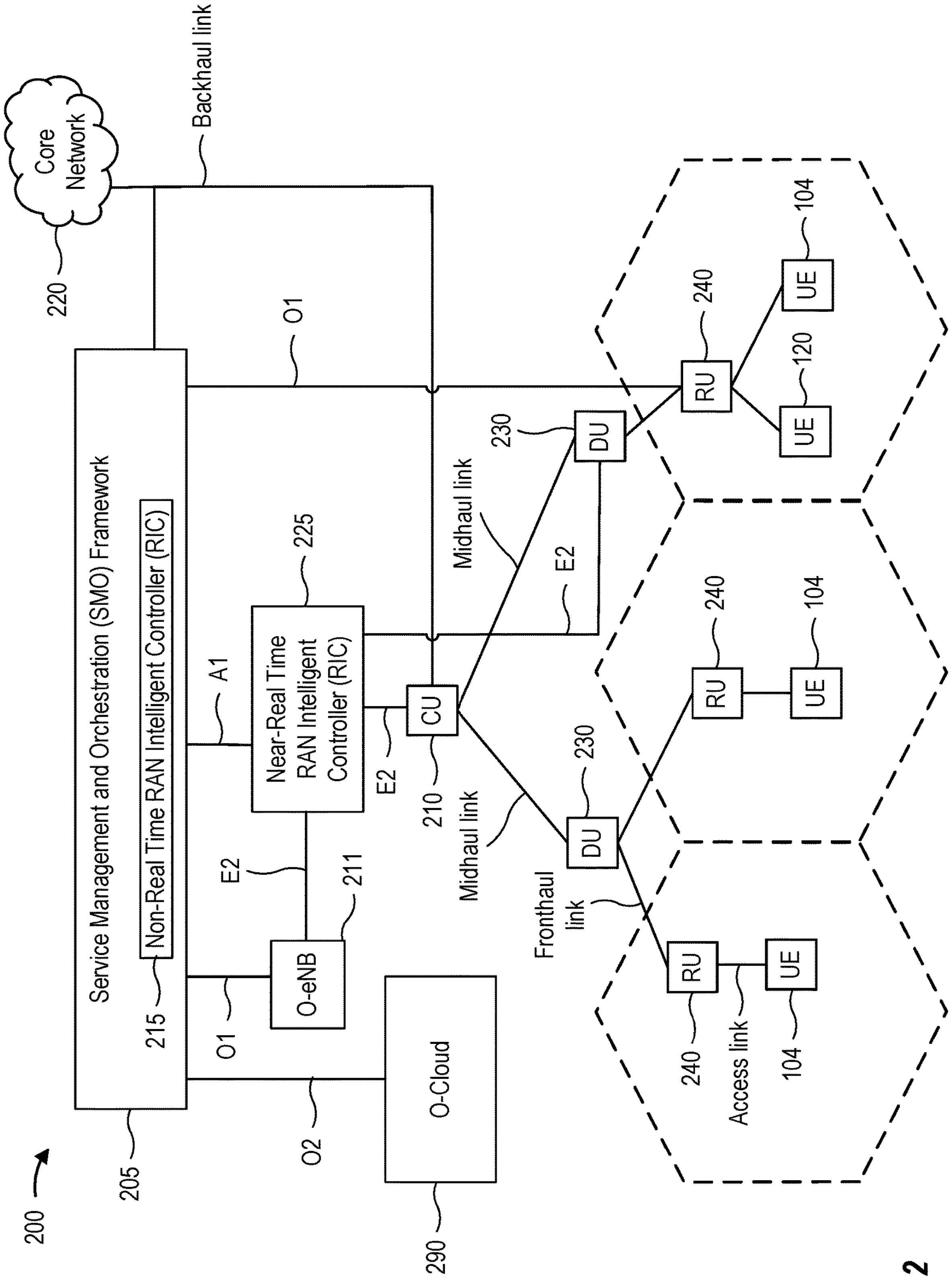
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as “Sub-6 GHz”. Similarly, 3GPP currently defines Frequency Range 2 (FR2) as including 24,250 MHz-52,600 MHz, which is sometimes referred to (interchangeably) as a “millimeter wave” (“mmW” or “mmWave”). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
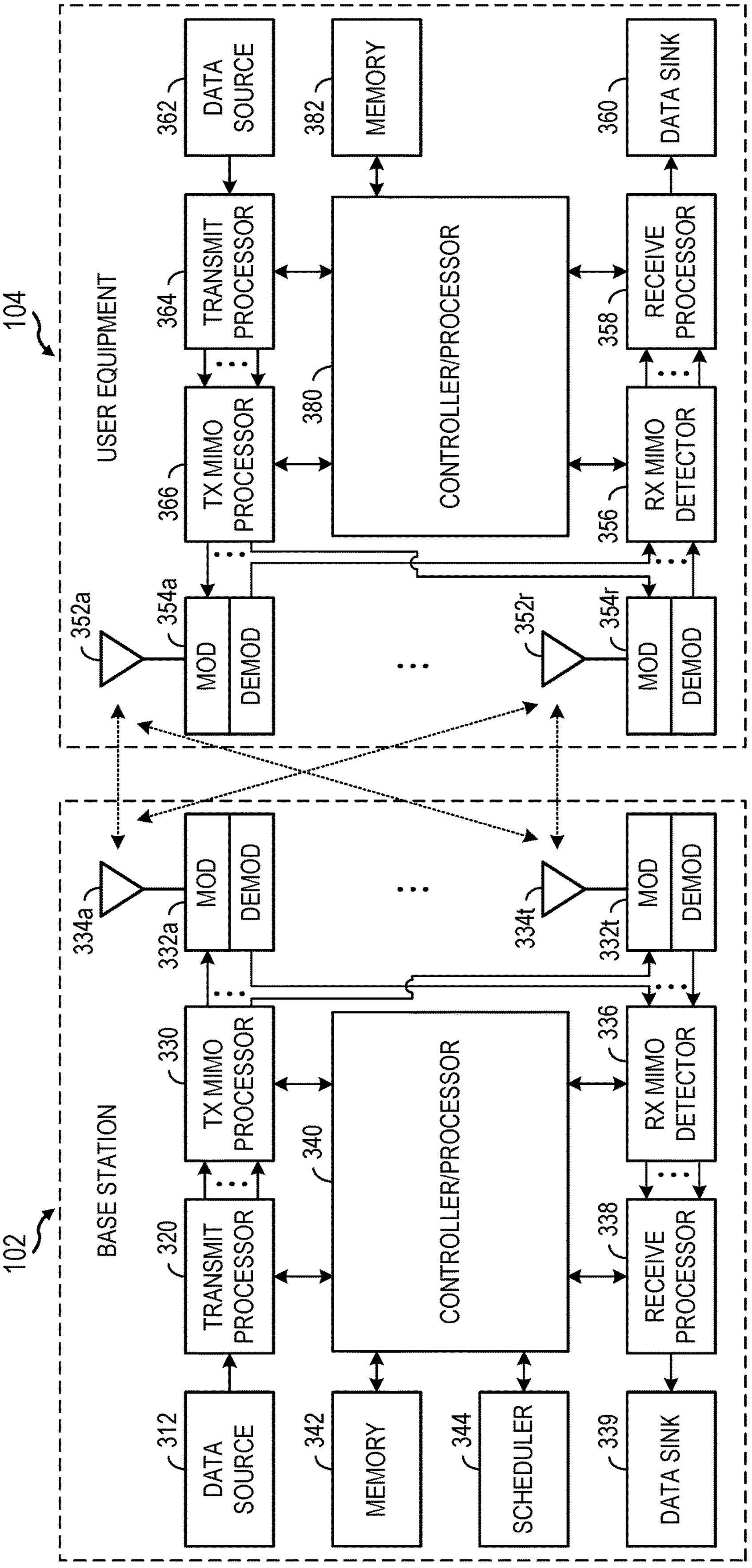
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
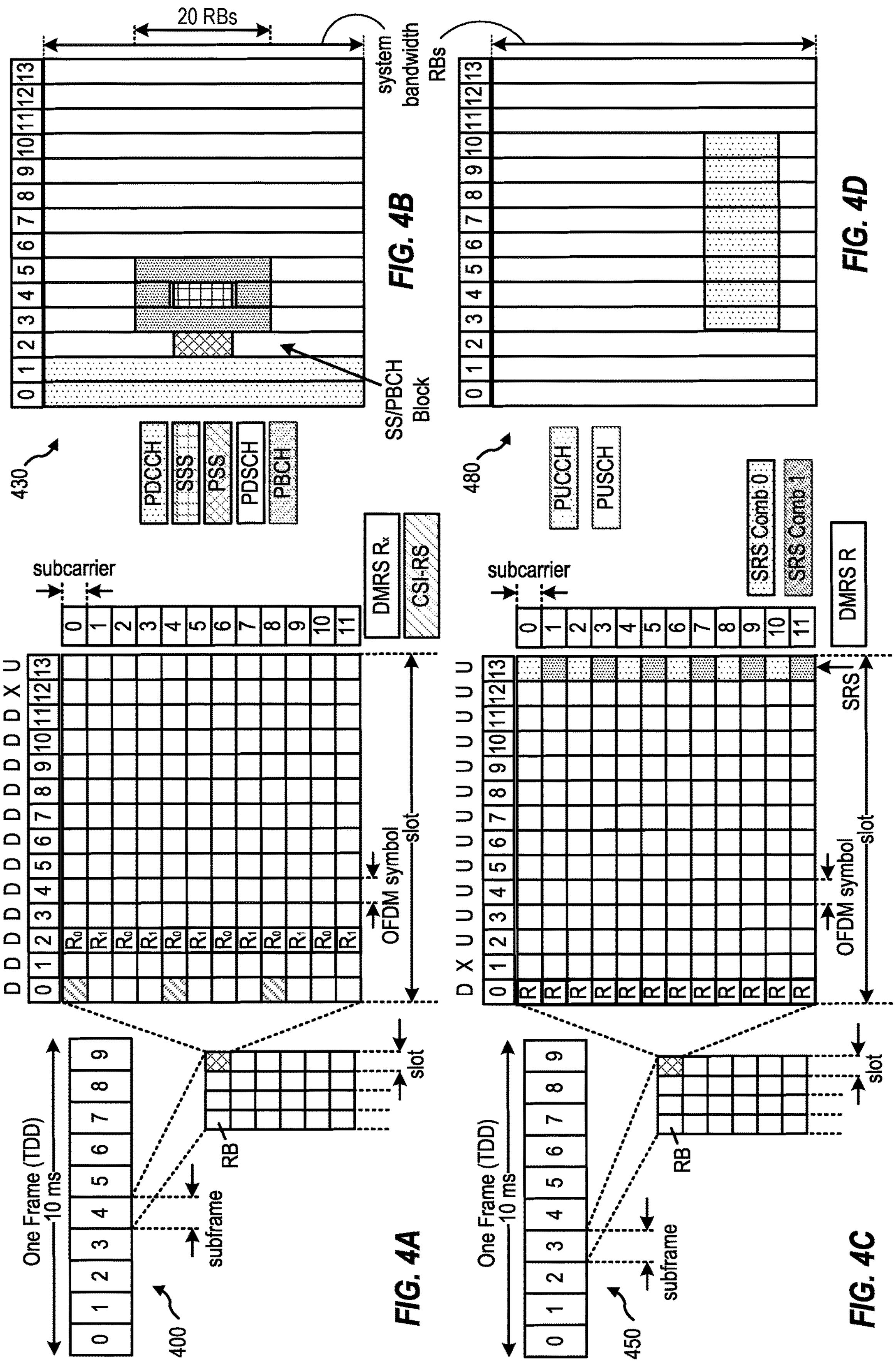
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Resource Allocations

Radio resources can be allocated to a UE by configured scheduling, dynamic scheduling, or a combination of configured and dynamic scheduling.

Configured scheduling is a mechanism in which the network can schedule PUSCH resources for the UE without using DCI to schedule each PUSCH transmission. Configured scheduling is done by configuring the UE with the scheduling parameters semi-statically in RRC signaling. Configured scheduling helps reduce the scheduling overhead.

Configured scheduling for the uplink may be done using a configured grant (CG). Uplink resources are scheduled via CGs that occur periodically (referred to as CG occasions) without the need for control signaling, eliminating expense and delay associated with dynamic signaling. CG parameters are typically configured via RRC signaling and the activation of the grant is through RRC or L1 signaling. Typically, the periodicity and configured parameters (e.g., number of resource blocks (RBs), modulation and coding scheme (MCS), number of repetitions) are the same for all CG occasions in the CG configuration.

Two different types of configured grants include Type 1 CGs and Type 2 CGs. In Type 1 CG, the network send higher layer RRC signaling (e.g., an RRCSetup or RRCReconfiguration message according to 3GPP TS 38.331) configuring all the parameters for PUSCH scheduling including a resource allocation. The UE may transmit PUSCH according to configured scheduling, without receiving any lower layer trigger (e.g., DCI). In Type 2 CG, after the RRC configuration, the network sends a DCI (e.g., masked with a configured scheduling radio network temporary identifier (CS-RNTI)) to activate the configured grant. In both Type 1 CG and Type 2 CG, the network may send medium access control (MAC) control element (CE) signaling to downselect the RRC configured resources and/or DCI overwriting the configured scheduling. Because the configured scheduling is semi-static, the UE may be overallocated with resources for uplink transmission, for example, due to changed channel conditions.

For dynamic grants, the network may send DCI to schedule each uplink transmission for the UE. In some cases, the network schedules uplink resources for the UE based on buffer status reports (BSRs) received from the UE. However, if a BSR accurately reflecting the UEs buffer size is not recently received, the network may still overallocate resources for the UE. In addition, a BSR codepoint can correspond to a large range (e.g., 7-8 MB). In addition, a UE may first send a scheduling request (SR) for resources to send the BSR. SR and BSR transmission, and waiting for an uplink grant, may increase uplink latency at the UE.

Configured scheduling is suitable for periodic and predictable traffic types (e.g., voice over internet protocol (VoIP), ultra-reliable low latency communication (URLLC), Internet-of-things (IoT), etc.). Repetition rates of configured scheduling (e.g., 1, 2, 4, and 8) may be adjusted to increase reliability.

Overview of Discontinuous Communication

As noted above, to reduce power consumption, a network entity (e.g., base station (BS) or gNB) or a UE may be configured for some type of cell discontinuous communications. For example, a UE may be configured for discontinuous reception (DRX) mode, during which the UE is may enter a low power state because it does not need to monitor for downlink transmissions. Similarly, in a discontinuous transmission (DTX) mode, a network may not transmit and may conserve power.

Figure 5A:
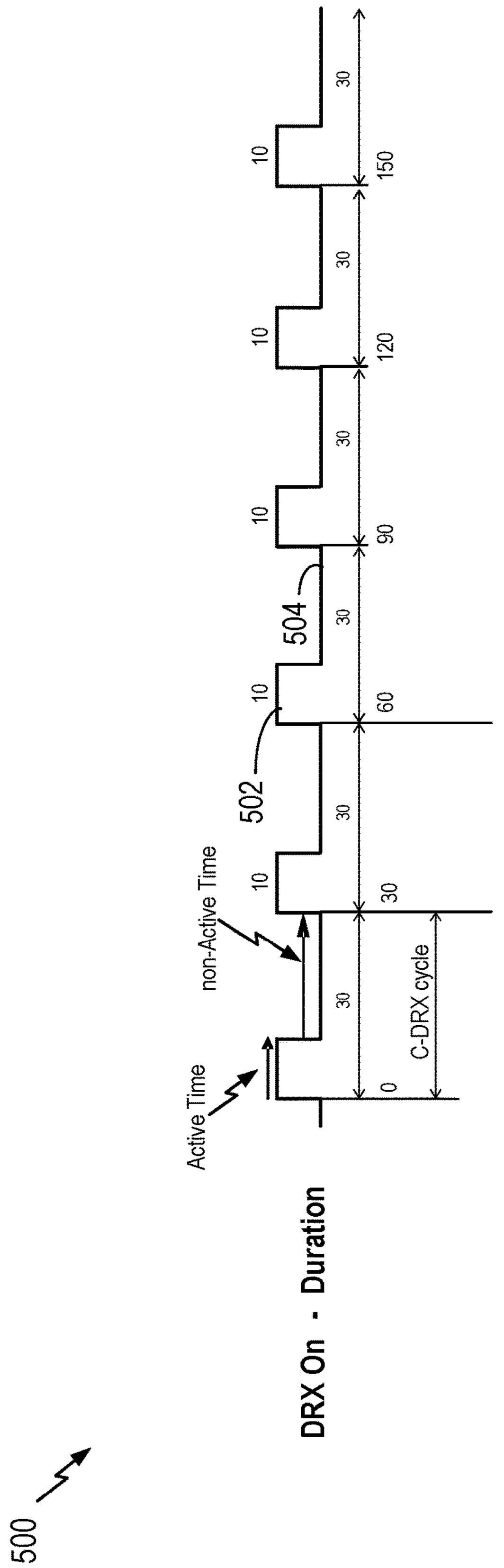
FIGS. 5A and 5B depict example timing diagrams for discontinuous reception (DRX) and discontinuous transmission (DTX) cycles.

As illustrated in the timing diagram 500 of FIG. 5A, a UE in a DRX mode (e.g., a connected DRX mode or CDRX) can cycle/alternate between "Active time" durations 502 and "non-Active" time durations 504.

During a CDRX Active time (or On-Duration), the UE monitors for physical downlink shared channel (PDSCH) activity continuously or with a given periodicity, receives downlink data, transmits UL data, and/or makes serving cell measurements or neighbor measurements. During Active time, a UE is generally considered "on" while various timers are running. For example, an Active duration timer (e.g., drx-onDurationTimer), an inactivity timer (drx-Inactivity-Timer), and a complete DRX cycle duration (e.g., drx-ShortCycle) may run during an Active time. The beginning of a DRX cycle may be defined by a starting offset value.

In the examples, the Active time is 10 ms and the CDRX cycle duration is 30 ms. The UE may be configured with an inactivity timer (starting an inactivity period 506) that restarts when activity is detected and expires after 5 ms without detected activity. When the inactivity timer expires, the UE enters an "inactive" or "sleep" mode.

Figure 5B:
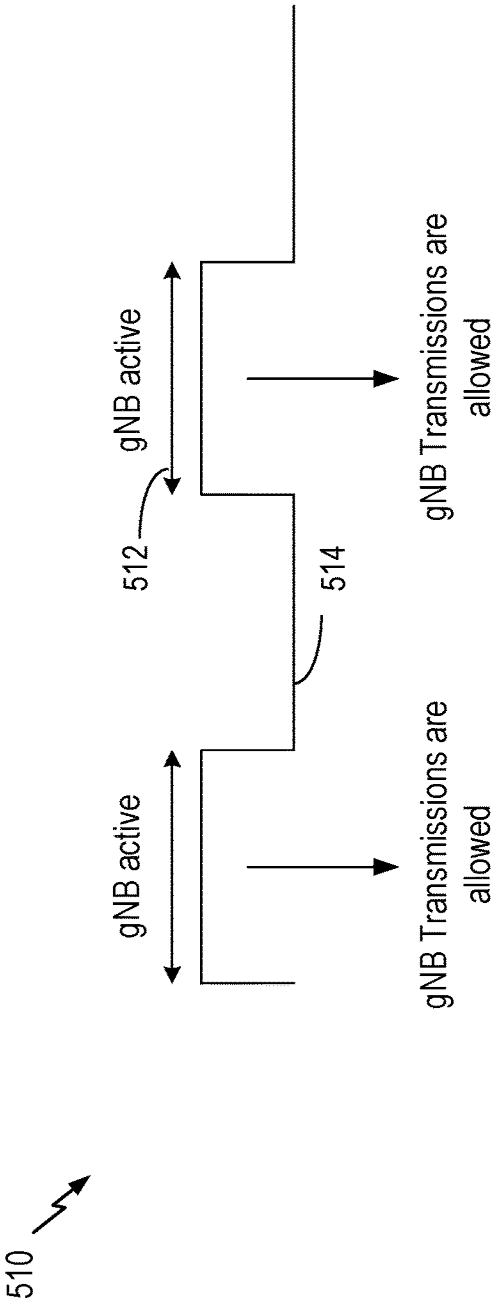

As illustrated in the timing diagram 510 of FIG. 5B, a network entity (e.g., a gNB) in a DTX mode can cycle/alternate between "Active time" durations 512 and "non-Active" time durations 514.

While the gNB is active at 512, the gNB is allowed to send transmissions. When non-Active, the gNB does not need to transmit or receive certain periodic signals/channels, which may allow a network entity to conserve power. For example, when non-Active, the gNB may not need to transmit or receive common channels/signals or user equipment (UE) specific signals/channels, and may have no transmission/reception or only keep limited transmission/reception.

DTX may be configured to achieve energy savings at the network. DTX cycles can be configured semi-statically or dynamically, with a particular configuration typically determined with data communication as a goal.

Aspects Related Transmission Configuration Alignment During DRX/DTX

In some cases, certain transmission configurations may be impacted by discontinuous communication (DTX/DRX) inactive modes. For example, as will be described in greater detail below, in some cases, such configurations may dictate that a UE should monitor for certain transmissions, even when the network is in a non-Active state. This may result in a waste of power if the UE continues to monitor for a downlink transmission and may also result in latency, increasing timelines.

One example of where a DTX/DRX timeline may impact a transmission configuration is an uplink data transmission scenario, where a physical uplink shared channel (PUSCH) is transmitted via a configured grant (CG). In such cases, an explicit hybrid automatic repeat request (HARQ) acknowledgement (ACK) feedback mechanism is not used to trigger retransmissions. Instead, a UE may wait for a retransmission indication from the network, for a defined period of time.

Figure 6:
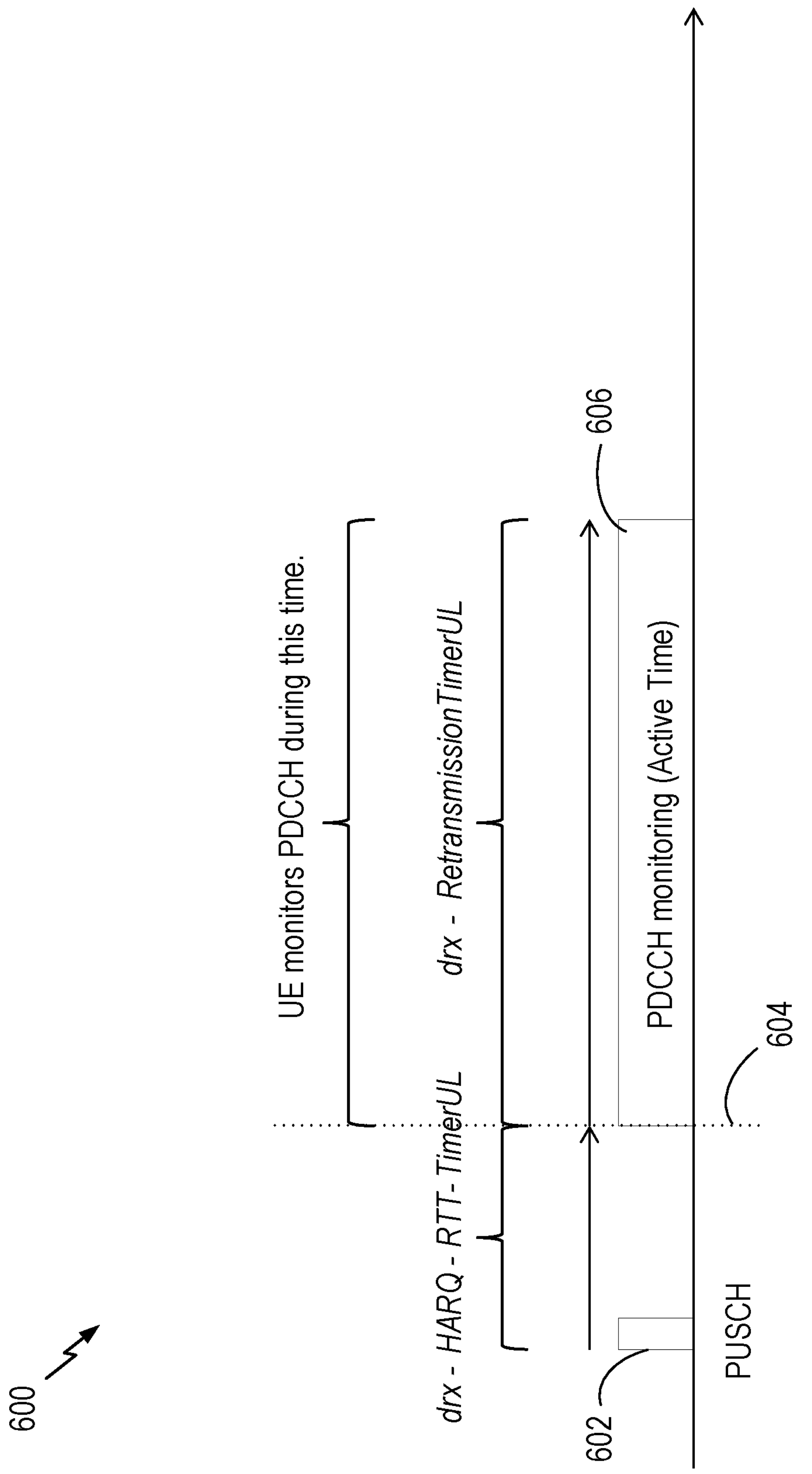
FIG. 6 depicts an example timing diagram for an uplink transmission configuration associated with DRX.

For example, as illustrated in the timeline 600 of FIG. 6, a UE may monitor for a physical downlink control channel (PDCCH) with a retransmission request, for a period of time after transmitting a PUSCH 602. As illustrated, a configured round-trip time (RTT) timer (drx-HARQ-RTT-TimerUL) starts after the PUSCH transmission. drx-HARQ-RTT-TimerUL generally represents the minimum duration before a UL HARQ retransmission grant is expected. When the drx-HARQ-RTT-TimerUL RTT timer expires, as shown at 604, a configured retransmission timer (drx-Retransmission-TimerUL) starts.

As shown at 606, while the drx-RetransmissionTimerUL is running, the UE may stay in an Active state to monitor for a PDCCH transmission triggering an uplink retransmission. If this period does not fully overlap with a DTX (on/Active) cycle, the UE may be monitoring unnecessarily, wasting power.

Another example scenario where a DTX/DRX timeline may impact a transmission configuration is a downlink (DL) scenario where the UE may trigger retransmission of a physical downlink shared channel (PDSCH) via a HARQ negative ACK (HARQ-NACK). After transmitting the HARQ-NACK, the UE may monitor for the PDSCH retransmission for a period of time.

Figure 7:
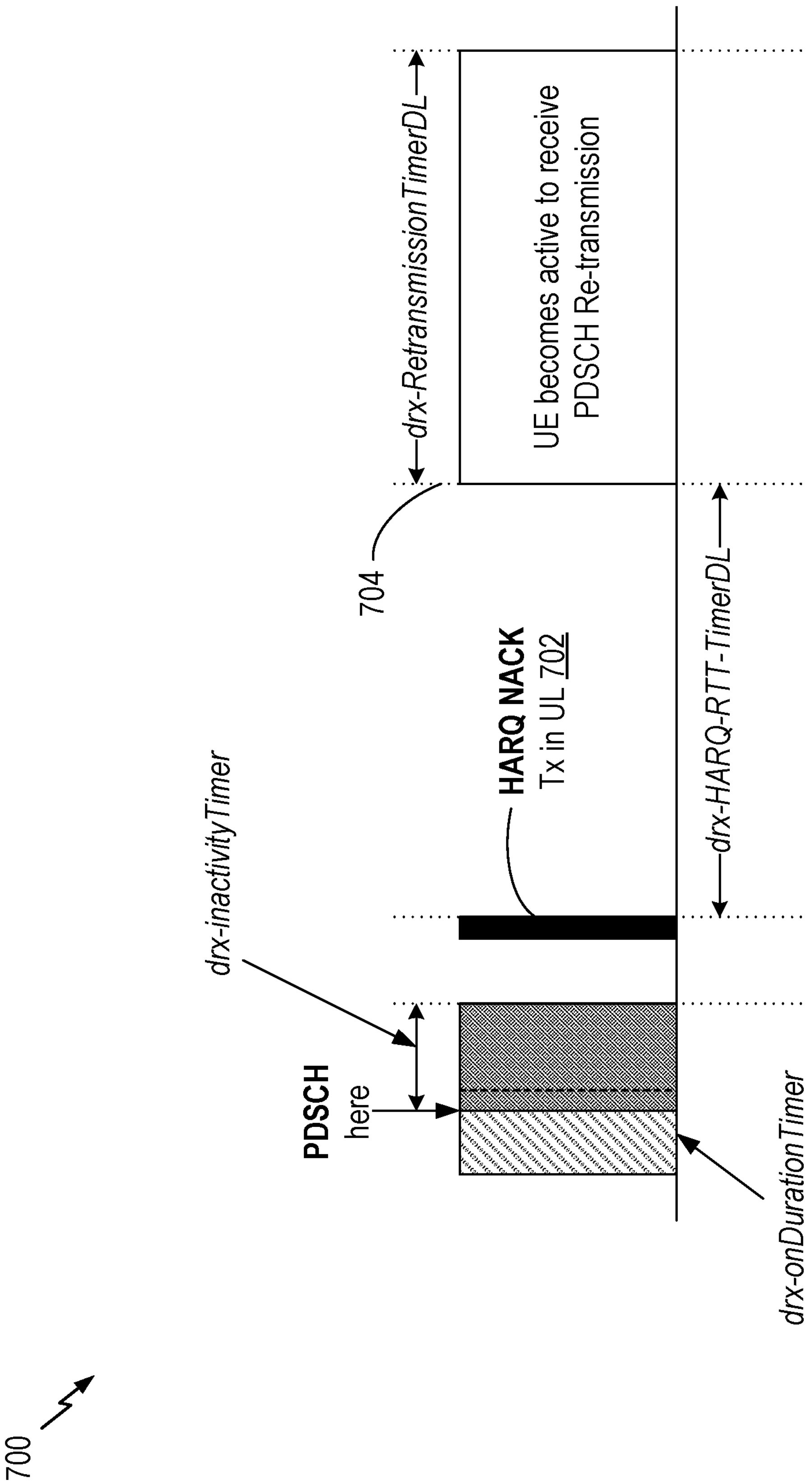
FIG. 7 depicts an example timing diagram for a downlink transmission configuration associated with DTX.

For example, as illustrated in the timeline 700 of FIG. 7, a UE may monitor for a PDSCH retransmission for a period of time after transmitting a HARQ-NACK 702. In the illustrated example, the UE starts a configured RTT timer (drx-HARQ-RTT-TimerDL) after transmitting the HARQ-NACK. drx-HARQ-RTT-TimerDL generally represents the minimum duration before a DL assignment for HARQ retransmission is expected. After drx-HARQ-RTT-TimerDL expires, at 704, a configured retransmission timer (drx-RetransmissionTimerDL) starts.

As shown, while the drx-RetransmissionTimerDL is running, the UE may stay in an Active state to monitor for a PDSCH retransmission. If this period does not fully overlap with a DTX (on/Active) cycle, the UE may be monitoring unnecessarily, wasting power.

Aspects of the present disclosure, however, may help address this issue by providing rules designed to align DTX/DRX cycles with uplink/downlink transmission configurations. The rules may help define UE and network-side behavior, for example, to extend DTX/DRX cycles and/or adjust periods when a UE monitors for transmissions.

Figure 8:
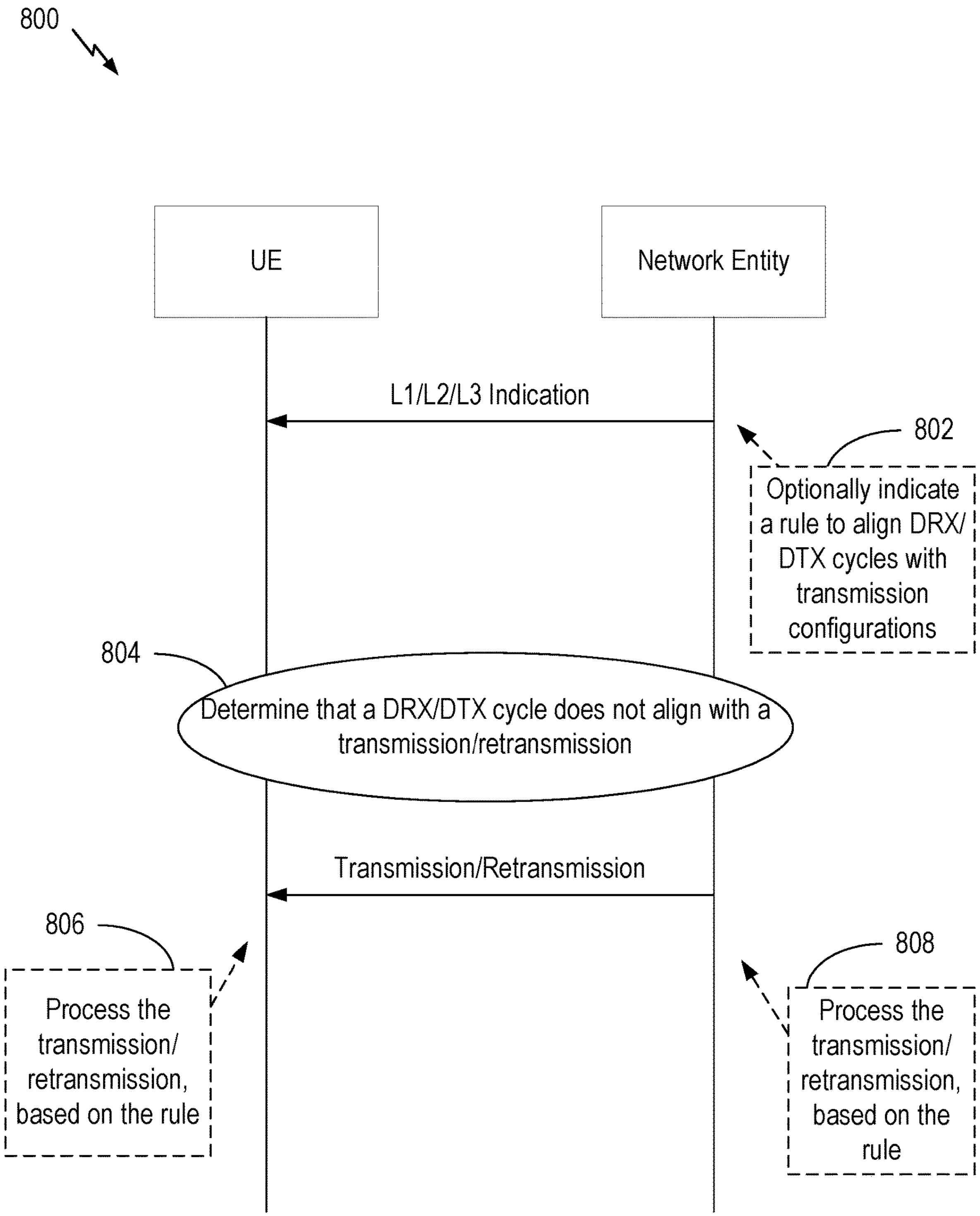
FIG. 8 depicts a call flow diagram, according to certain aspects of the present disclosure.

Mechanisms for aligning DTX/DRX cycles with uplink/downlink transmissions proposed herein may be understood with reference to the call flow diagram 800 of FIG. 8. In some aspects, the network entity shown in FIG. 8 may be an example of the BS 102 depicted and described with respect to FIGS. 1 and 3 or a disaggregated base station depicted and described with respect to FIG. 2. Similarly, the UE shown in FIG. 8 may be an example of UE 104 depicted and described with respect to FIGS. 1 and 3. However, in other aspects, UE 104 may be another type of wireless communications device and BS 102 may be another type of network entity or network node, such as those described herein.

As illustrated at 802, the network entity may indicate, to the UE, a rule to align DRX/DTX cycles with transmission configurations. As illustrated, the indication may be signaled via layer 1 (L1 or physical/PHY), layer 2 (L2 or MAC), and/or layer 3 (L3, such as RRC) signaling.

Then, as shown at 804, both the network entity and the UE determine that a DRX/DTX cycle does not align with a transmission/retransmission. The network then sends the transmission/retransmission to the UE. As shown at 806 and 808, the UE and network entity may both process the transmission/retransmission according to the rule.

Processing the transmission/retransmission may involve adjusting some type of timing so that the transmission may be sent/received during an active time of a discontinuous communication cycle. For example, based on the rule, the UE and network entity may both adjust a DRX/DTX cycle and/or a transmission configuration to allow a corresponding transmission/retransmission to be sent and received.

Aspects of the present disclosure provide various options for how DRX/DTX cycles and transmission configurations may be adjusted, based on one or more rules.

According to one option, the drx-HARQ-RTT-TimerUL timer and the drx-RetransmissionTimerUL timer may be adjusted to effectively extend the cell DRX duration. Referring back to FIG. 6, this may allow the UE Active state to align with a PDCCH transmission triggering an uplink retransmission, which may help the UE avoid monitoring unnecessarily and wasting power.

According to another option, the drx-HARQ-RTT-TimerDL RTT timer and drx-RetransmissionTimerDL retransmission timer may effectively extend the cell DTX duration. Referring back to FIG. 7, this may allow the UE Active state to align with a PDSCH retransmission.

The network entity may indicate to the UE whether an active cell DRX/DTX times is extendable. This indication may be provided, for example, via a scheduling downlink control information (DCI) (e.g., that schedules the corresponding PUSCH/PDSCH) or in a (e.g., newly defined/dedicated) non-scheduling DCI. In general, the indication of whether DRX/DTX is extendable can be provided via L1, L2, or L3 signaling from the network entity to the UE.

In some cases, the network may allow for cell DRX/DTX extension for specific UL logical channel groups (LCGs), logical channel prioritizations (LCPs), L1/L2 priorities, and/or quality of services (QoSs). For example, based on the priority, LCG, and/or LCP of a given packet, the UE may know or ascertain whether the network entity will extend the active cell DRX/DTX and, possibly, to what degree such an extension may be implemented. This specified extension may apply for both connected mode DRX (C-DRX) and connected mode DTX (C-DTX). In some cases, this extension may be configured based on L1/L2/L3 signaling per LCG. In some cases, this extension may be autonomously derived according to a predefined rule, such that the network entity may extend C-DTX/DRX and the UE may expect the network entity to extend according to the rule.

There are various options for determining/indicating a particular time of extension of the C-DTX/DRX. For example, the extension time may be a particular time configured via L1/L2/L3 signaling (e.g., including scheduling DCI that scheduled the PUSCH/PDSCH) or may be preconfigured (e.g., which may be similar to application times specified in a standard specification).

In some cases, the extension time of the C-DTX/DRX may be derived from some other configured time. For example, the extension time may be a same time as the defined for drx-HARQ-RTT-TimerDL, drx-Retransmission-TimerDL, or a combination thereof. For example, the extension time may be the drx-HARQ-RTT-TimerDL the drx-RetransmissionTimerDL, plus some offset value(s) configured by the network.

In some cases, a UE may provide a status report to the network. How long to extend DTX/DRX may be based, at least in part, on the status report.

For example, in certain wireless systems or scenarios, such as extended reality (XR) deployments, a network entity may receive a delay status report (DSR) from the UE. In some cases, the network entity and the UE may agree on expected C-DRX/C-DTX sizes. This agreement may dictate, for example, what values to use based on reported DSR and associated L1/L2 priorities of packets, and/or based on other agreements between the UE and the network entity on extension behavior and procedure.

In another example, a network entity may receive an energy status report (ESR) from the UE. The ESR may contain at least one of a charging rate profile, a discharging rate profile, an energy level profile, an energy value or a communication state profile. Each profile may contain a current value and predicted values over a certain preconfigured time period. In some cases, based on an energy level profile (an amount of energy at a storage unit or battery) of an ESR, a UE may report an energy value X to be greater than a value Y, where Y is a configured threshold. When X is greater than Y, the UE and the network entity may agree on an extension behavior and procedure based on the energy level profile of the ESR. When X is less than Y, the UE and the network entity may agree not to implement an extension behavior, or may agree to reduce or disable applicable timers. Similarly, a UE may report a value X for an energy state, communication state, or multiple states within an ESR, where each state is associated with a certain UE or behavior configuration. In some cases, the UE may be an Internet-of-Things (IOT) device, a zero power device, or an energy harvesting device.

In some cases, a rule for alignment may allow for a dynamic RTT timer and/or a dynamic retransmission timer for DL and/or UL. Dynamic RTT and/or dynamic retransmission timers may be set for the purpose of energy saving, where each network energy state (NES) has different RTT/retransmission timers. In some cases, a network entity may shorten RTT/retransmission timers to fit into (align with) the current C-DTX/DRX, or make RTT/retransmission longer based at least on network capability and/or UE capability. An indication to change or adapt RTT/retransmission timers (which may include scheduling DCI the transmission) may be provided via L1, L2, or L3 signaling from the network entity to the UE.

There are various options (rules) how one or both of these timers may be adjusted, for example, depending on whether a retransmission request monitoring window starts before, during, or after a DTX Active time. According to a first option, a UE may simply monitor for retransmission requests regardless of the DTX cycle.

Figure 9A:
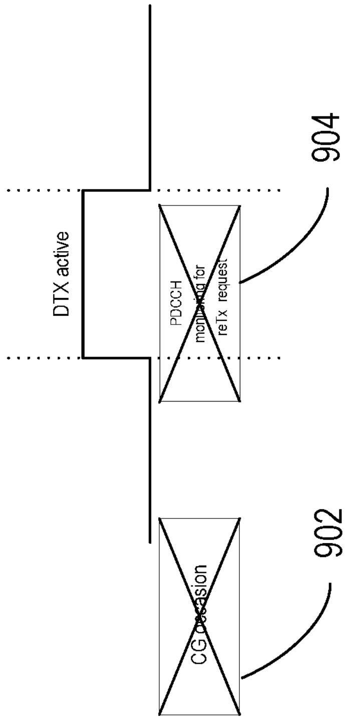
FIGS. 9A, 9B, and 9C depict example timing diagrams illustrating rules for aligning a physical downlink control channel (PDCCH) monitoring window with a DTX Active time.

According to a second option, as illustrated in FIG. 9A, if a retransmission request monitoring window 904 starts before a DTX Active time, all UL CG occasions whose time windows start before the DTX Active time (e.g., CG occasion 902) are not used by the UE.

Figure 9B:
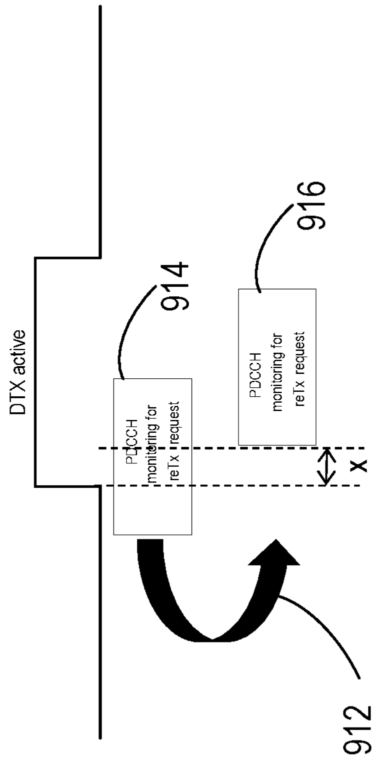

According to a third option, as illustrated in FIG. 9B, if the initial drx-RetransmissionTimerUL timer would result in a retransmission request monitoring window 914 starting before the DTX Active time, the timer may be adjusted, as shown at 912, resulting in a shifted retransmission request window 916 that starts at the beginning or within the DTX Active time, without modifying the length of the monitoring window. In some cases, the drx-RetransmissionTimerUL timer may be adjusted to start at the beginning of or X time units past the beginning of the DTX Active time. The value of X may be configurable by the network entity, may be UE-specific, or may be common across multiple UEs.

Figure 9C:
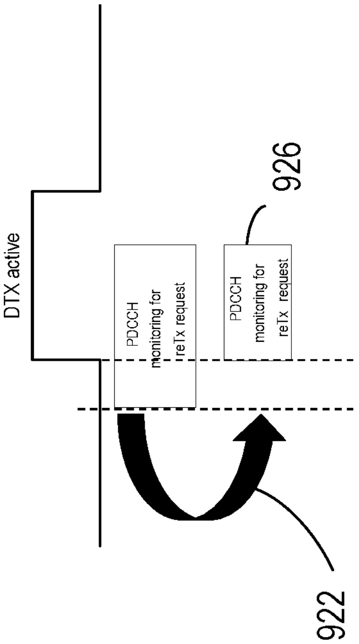

As illustrated in FIG. 9C, in some cases, in addition to shifting the start of the drx-RetransmissionTimerUL timer, as shown at 922, the drx-RetransmissionTimerUL timer may be shortened. This may result in a shorter retransmission request window 926 that fully overlaps with the DTX cycle. In some cases, the drx-RetransmissionTimerUL timer may only be shortened if the shifted retransmission request window would otherwise not be fully contained within the DTX cycle.

There are various options (rules) to apply if the drx-RetransmissionTimerUL timer starts within the DTX Active time. This situation may be problematic and warrant adjustment, particularly if the retransmission request monitoring window would otherwise extend beyond the end of the DTX Active time.

Figure 10A:
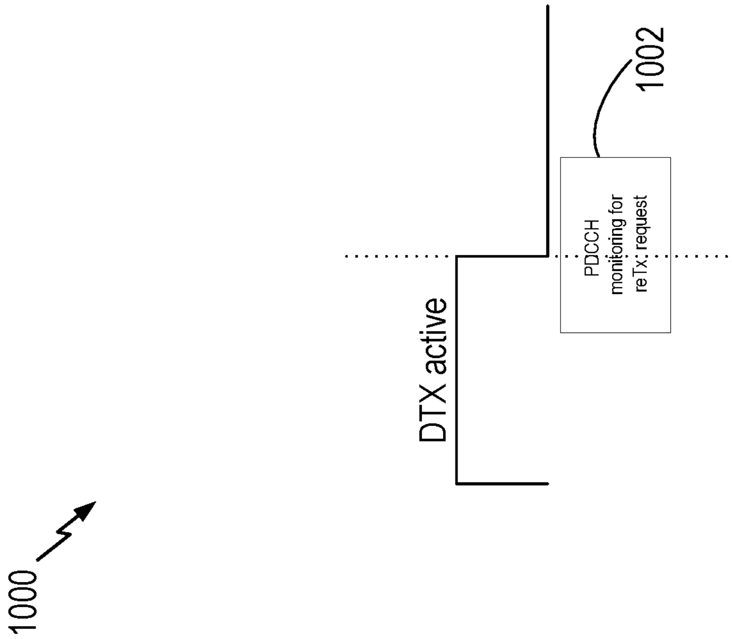
FIGS. 10A and 10B depict example timing diagrams illustrating rules for aligning a PDCCH monitoring window with a DTX Active time.

According to a first option, as illustrated in FIGS. 10A, a UE may simply monitor for retransmission requests for the entirety of the request monitoring window 1002, regardless of the DTX cycle. In other words, the retransmission request monitoring window may still be active until the end of the configured window (or until receiving a response), even if it extends beyond the DTX cycle.

Figure 10B:
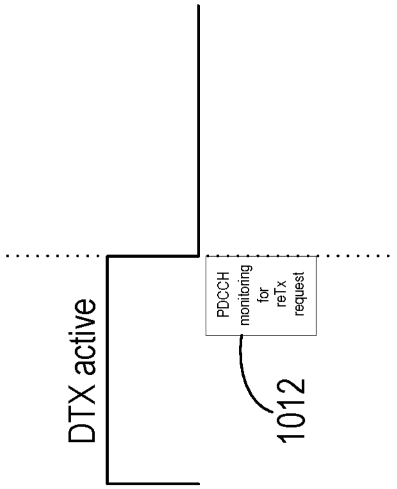

According to a second option, as illustrated in FIG. 10B, a retransmission request monitoring window 1012 may be shortened/truncated to align with the end of the DTX Active time.

According to a third option, when the drx-RetransmissionTimerUL timer starts within the DTX Active time, the DTX cycle may be extended by a certain amount (e.g., X units of time). In this case, the retransmission request monitoring window may be active for its initial duration or until the end of the extended active duration. This option effectively extends the DTX Active time, in contrast to options that only extend the retransmission request monitoring window. In some cases, extending the DTX Active time in this manner, may allow the network to perform other operations (e.g., communicating with other UEs, while active).

In one case, the particular option and/or rule to be used to align DRX/DTX and a transmission configuration may be indicated to the UE via L1, L2, or L3 signaling as described above (and as shown in the call flow diagram 800 of FIG. 8). In one case, the option and/or rule may be updated/indicated via a dynamic DTX control indication. A signaling control message indicating the DTX state triggering/activation may include an indication or an update of the retransmission request monitoring window behavior to be used until the next DTX state triggering/activation is provided to the UE. In one case, the option and/or rule may be determined automatically as a function of the data transmitted (e.g., different types of data may warrant different options/rules). The option and/or rule may also be indicated via a combination of these options.

Example Operations

Figure 11:
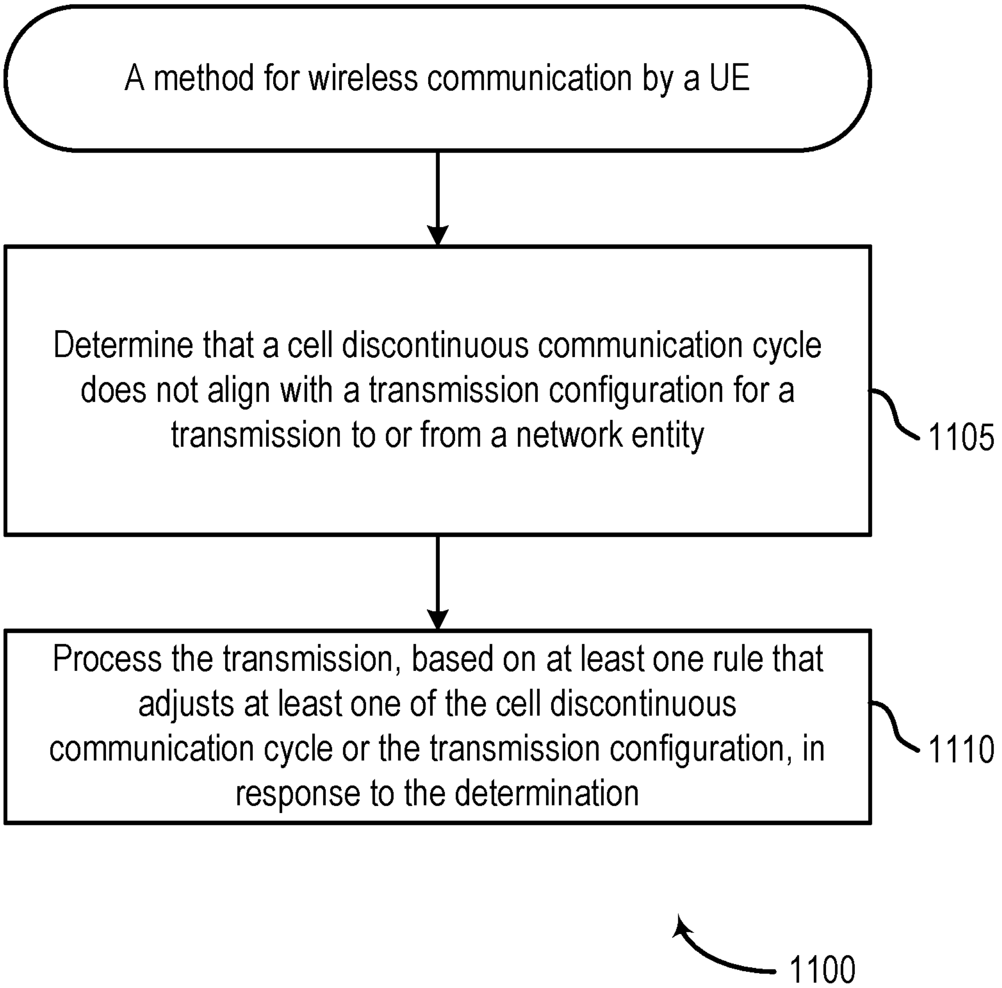
FIG. 11 depicts a method for wireless communications.

FIG. 11 shows an example of a method 1100 of wireless communication by a UE, such as a UE 104 of FIGS. 1 and 3.

Method 1100 begins at step 1105 with determining that a cell discontinuous communication cycle does not align with a transmission configuration for a transmission to or from a network entity. In some cases, the operations of this step refer to, or may be performed by, circuitry for determining and/or code for determining as described with reference to FIG. 13.

Method 1100 then proceeds to step 1110 with processing the transmission, based on at least one rule that adjusts at least one of the cell discontinuous communication cycle or the transmission configuration, in response to the determination. In some cases, the operations of this step refer to, or may be performed by, circuitry for processing and/or code for processing as described with reference to FIG. 13.

In some aspects, the at least one rule dictates that the cell discontinuous communication cycle be extended to allow for processing the transmission.

In some aspects, the cell discontinuous communication cycle comprises a DRX cycle; the transmission comprises a retransmission of a PUSCH from the UE; and the at least one rule dictates that the DRX cycle be extended to allow for the retransmission of the PUSCH.

In some aspects, the cell discontinuous communication cycle comprises a DTX cycle; the transmission comprises a retransmission of a PDSCH from the network entity; and the at least one rule dictates that the DTX cycle be extended to allow for the retransmission of the PDSCH.

In some aspects, the method 1100 further includes receiving an indication of whether or not the cell discontinuous communication cycle is extendable. In some cases, the operations of this step refer to, or may be performed by, circuitry for receiving and/or code for receiving as described with reference to FIG. 13.

In some aspects, the indication is received via DCI scheduling an uplink transmission, a DCI scheduling a downlink transmission, or a non-scheduling DCI.

In some aspects, the indication is received via physical layer signaling, MAC-CE signaling, or RRC signaling.

In some aspects, the indication also indicates that the cell discontinuous communication cycle is extendable for processing certain LCGs, LCPs, or QoSs.

In some aspects, the method 1100 further includes receiving an indication of how long to extend the cell discontinuous communication cycle. In some cases, the operations of this step refer to, or may be performed by, circuitry for receiving and/or code for receiving as described with reference to FIG. 13.

In some aspects, the indication is received via physical layer signaling, MAC-CE signaling, or RRC signaling.

In some aspects, the indication is received as at least one of a configured RTT timer value, a configured retransmission timer value, or one or more offset values.

In some aspects, the method 1100 further includes transmitting a status report to the network entity. In some cases, the operations of this step refer to, or may be performed by, circuitry for transmitting and/or code for transmitting as described with reference to FIG. 13.

In some aspects, the method 1100 further includes determining how long to extend the cell discontinuous communication cycle based, at least in part, on the status report. In some cases, the operations of this step refer to, or may be performed by, circuitry for determining and/or code for determining as described with reference to FIG. 13.

In some aspects, the cell discontinuous communication cycle comprises a DTX cycle; the transmission comprises a retransmission of a PDSCH from the network entity; and the at least one rule dictates how to monitor for the retransmission of the PDSCH when a retransmission timer starts within an active DTX time.

In some aspects, the at least one rule dictates that at least one of a RTT timer value or retransmission timer value be dynamically updated to allow for processing the transmission.

In some aspects, the method 1100 further includes receiving an indication of how to dynamically update the RTT timer value or the retransmission timer value. In some cases, the operations of this step refer to, or may be performed by, circuitry for receiving and/or code for receiving as described with reference to FIG. 13.

In some aspects, the indication is received via physical layer signaling, MAC-CE signaling, or RRC signaling.

In some aspects, the method 1100 further includes determining at least one of:

the at least one rule to apply; or how to apply the at least one rule. In some cases, the operations of this step refer to, or may be performed by, circuitry for determining and/or code for determining as described with reference to FIG. 13.

In some aspects, the determination is based on at least one of: signaling from the network entity; or a function of data involved in the transmission.

Figure 13:
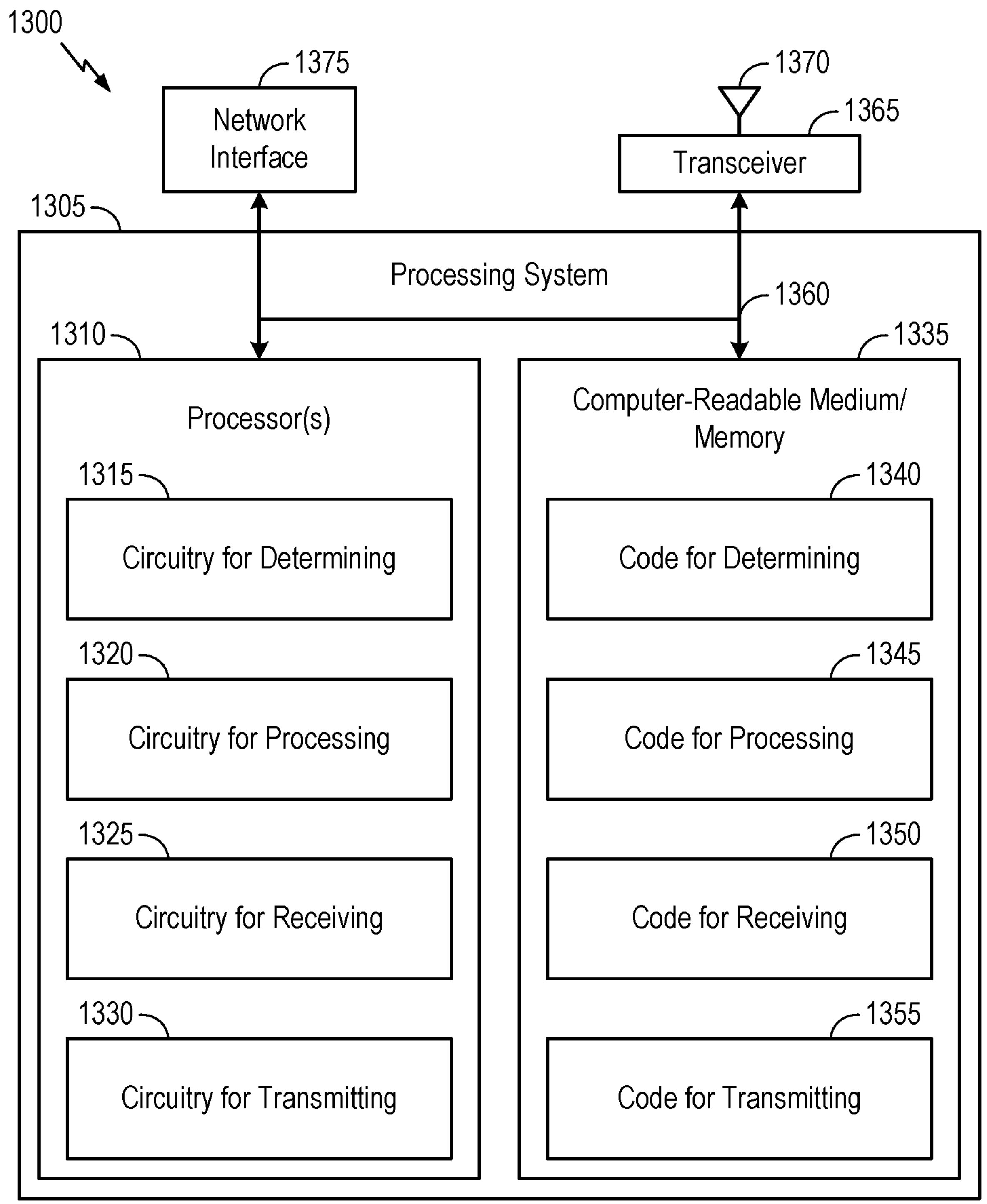
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Figure 12:
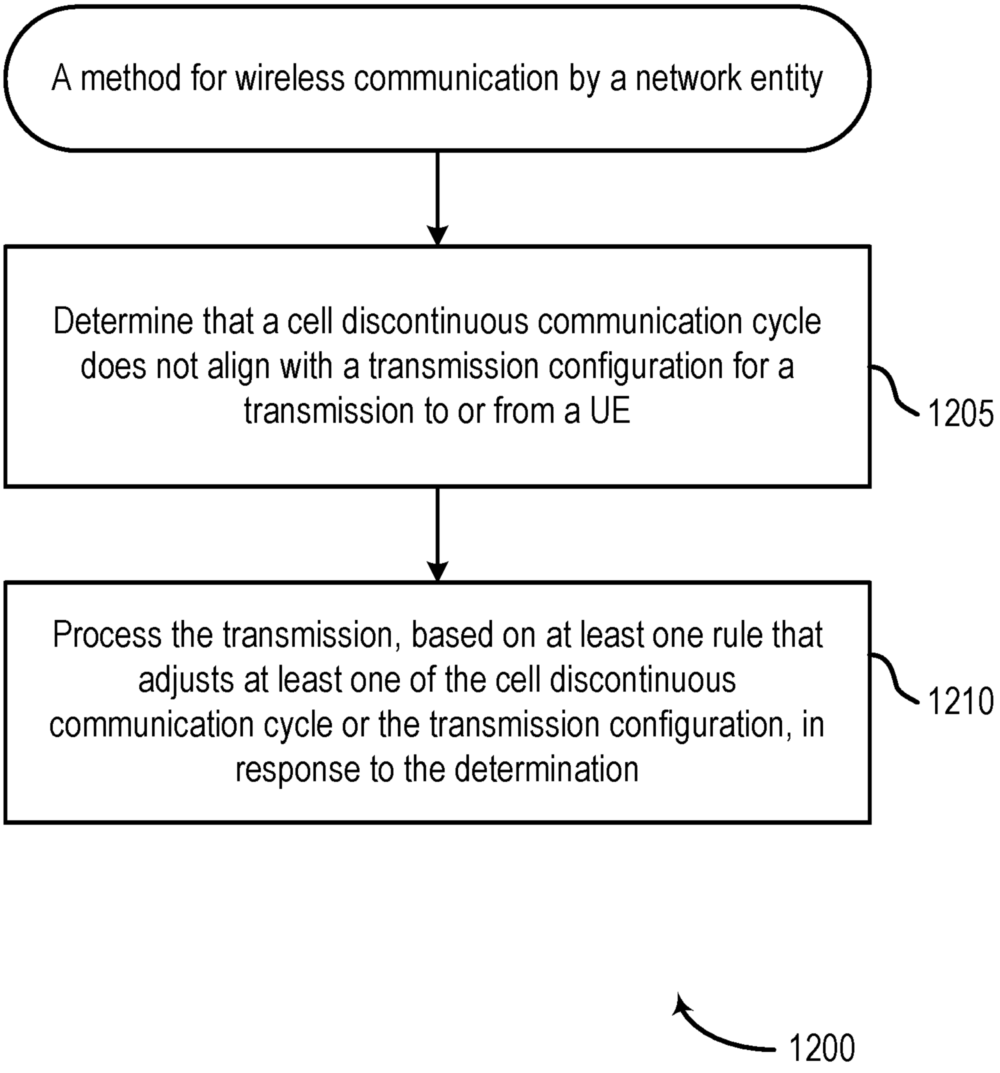
FIG. 12 depicts a method for wireless communications.

FIG. 12 shows an example of a method 1200 of wireless communication by a network entity, such as a BS 102 of FIGS. 1 and 3, or a disaggregated base station as discussed with respect to FIG. 2.

Method 1200 begins at step 1205 with determining that a cell discontinuous communication cycle does not align with a transmission configuration for a transmission to or from a UE. In some cases, the operations of this step refer to, or may be performed by, circuitry for determining and/or code for determining as described with reference to FIG. 13.

Method 1200 then proceeds to step 1210 with processing the transmission, based on at least one rule that adjusts at least one of the cell discontinuous communication cycle or the transmission configuration, in response to the determination. In some cases, the operations of this step refer to, or may be performed by, circuitry for processing and/or code for processing as described with reference to FIG. 13.

In some aspects, the at least one rule dictates that the cell discontinuous communication cycle be extended to allow for processing the transmission.

In some aspects, the cell discontinuous communication cycle comprises a DRX cycle; the transmission comprises a retransmission of a PUSCH from the UE; and the at least one rule dictates that the DRX cycle be extended to allow for the retransmission of the PUSCH.

In some aspects, the cell discontinuous communication cycle comprises a DTX cycle; the transmission comprises a retransmission of a PDSCH from the network entity; and the at least one rule dictates that the DTX cycle be extended to allow for the retransmission of the PDSCH.

In some aspects, the method 1200 further includes transmitting, to the UE, an indication of whether or not the cell discontinuous communication cycle is extendable. In some cases, the operations of this step refer to, or may be performed by, circuitry for transmitting and/or code for transmitting as described with reference to FIG. 13.

In some aspects, the indication is transmitted via DCI scheduling an uplink transmission, a DCI scheduling a downlink transmission, or a non-scheduling DCI.

In some aspects, the indication is transmitted via physical layer signaling, MAC-CE signaling, or RRC signaling.

In some aspects, the indication also indicates that the cell discontinuous communication cycle is extendable for processing certain LCGs, LCPs, or QoSs.

In some aspects, the method 1200 further includes transmitting, to the UE, an indication of how long to extend the cell discontinuous communication cycle. In some cases, the operations of this step refer to, or may be performed by, circuitry for transmitting and/or code for transmitting as described with reference to FIG. 13.

In some aspects, the indication is transmitted via physical layer signaling, MAC-CE signaling, or RRC signaling.

In some aspects, the indication is transmitted as at least one of a configured RTT timer value, a configured retransmission timer value, or one or more offset values.

In some aspects, the method 1200 further includes receiving a status report from the UE. In some cases, the operations of this step refer to, or may be performed by, circuitry for receiving and/or code for receiving as described with reference to FIG. 13.

In some aspects, the method 1200 further includes determining how long to extend the cell discontinuous communication cycle based on the status report and associated packet priorities. In some cases, the operations of this step refer to, or may be performed by, circuitry for determining and/or code for determining as described with reference to FIG. 13.

In some aspects, the cell discontinuous communication cycle comprises a DTX cycle; the transmission comprises a retransmission of a PDSCH from the network entity; and the at least one rule dictates how to determine a window for the retransmission of the PDSCH when a retransmission timer starts within an active DTX time.

In some aspects, the at least one rule dictates that at least one of a RTT timer value or retransmission timer value be dynamically updated to allow for processing the transmission.

In some aspects, the method 1200 further includes transmitting, to the UE, an indication of how to dynamically update the RTT timer value or the retransmission timer value. In some cases, the operations of this step refer to, or may be performed by, circuitry for transmitting and/or code for transmitting as described with reference to FIG. 13.

In some aspects, the indication is transmitted via physical layer signaling, MAC-CE signaling, or RRC signaling.

In some aspects, the method 1200 further includes determining at least one of: the at least one rule to apply; or how to apply the at least one rule. In some cases, the operations of this step refer to, or may be performed by, circuitry for determining and/or code for determining as described with reference to FIG. 13.

In some aspects, the determination is based on at least one of: signaling from the network entity; or a function of data involved in the transmission.

In one aspect, method 1200, or any aspect related to it, may be performed by an apparatus, such as communications device 1300 of FIG. 13, which includes various components operable, configured, or adapted to perform the method 1200. Communications device 1300 is described below in further detail.

Note that FIG. 12 is just one example of a method, and other methods including fewer, additional, or alternative steps are possible consistent with this disclosure.

Example Communications Device

FIG. 13 depicts aspects of an example communications device 1300. In some aspects, communications device 1300 is a user equipment, such as UE 104 described above with respect to FIGS. 1 and 3. In some aspects, communications device 1300 is a network entity, such as BS 102 of FIGS. 1 and 3, or a disaggregated base station as discussed with respect to FIG. 2.

The communications device 1300 includes a processing system 1305 coupled to the transceiver 1365 (e.g., a transmitter and/or a receiver). In some aspects (e.g., when communications device 1300 is a network entity), processing system 1305 may be coupled to a network interface 1375 that is configured to obtain and send signals for the communications device 1300 via communication link(s), such as a backhaul link, midhaul link, and/or fronthaul link as described herein, such as with respect to FIG. 2. The transceiver 1365 is configured to transmit and receive signals for the communications device 1300 via the antenna 1370, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1335 via a bus 1360. In certain aspects, the computer-readable medium/memory 1335 is configured to store instructions (e.g., computer-executable code) that when executed by the one or more processors 1310, cause the one or more processors 1310 to perform the method 1100 described with respect to FIG. 11, or any aspect related to it; and the method 1200 described with respect to FIG. 12, or any aspect related to it. Note that reference to a processor performing a function of communications device 1300 may include one or more processors 1310 performing that function of communications device 1300.

In the depicted example, computer-readable medium/memory 1335 stores code (e.g., executable instructions), such as code for determining 1340, code for processing 1345, code for receiving 1350, and code for transmitting 1355. Processing of the code for determining 1340, code for processing 1345, code for receiving 1350, and code for transmitting 1355 may cause the communications device 1300 to perform the method 1100 described with respect to FIG. 11, or any aspect related to it; and the method 1200 described with respect to FIG. 12, or any aspect related to it.

The one or more processors 1310 include circuitry configured to implement (e.g., execute) the code stored in the computer-readable medium/memory 1335, including circuitry for determining 1315, circuitry for processing 1320, circuitry for receiving 1325, and circuitry for transmitting 1330. Processing with circuitry for determining 1315, circuitry for processing 1320, circuitry for receiving 1325, and circuitry for transmitting 1330 may cause the communications device 1300 to perform the method 1100 described with respect to FIG. 11, or any aspect related to it; and the method 1200 described with respect to FIG. 12, or any aspect related to it.

Various components of the communications device 1300 may provide means for performing the method 1100 described with respect to FIG. 11, or any aspect related to it; and the method 1200 described with respect to FIG. 12, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1365 and the antenna 1370 of the communications device 1300 in FIG. 13. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1365 and the antenna 1370 of the communications device 1300 in FIG. 13.

Example Clauses

Implementation examples are described in the following numbered clauses:

Clause 1: A method for wireless communication by a UE, comprising: determining that a cell discontinuous communication cycle does not align with a transmission configuration for a transmission to or from a network entity; and processing the transmission, based on at least one rule that adjusts at least one of the cell discontinuous communication cycle or the transmission configuration, in response to the determination.

Clause 2: The method of Clause 1, wherein the at least one rule dictates that the cell discontinuous communication cycle be extended to allow for processing the transmission.

Clause 3: The method of Clause 2, wherein: the cell discontinuous communication cycle comprises a DRX cycle; the transmission comprises a retransmission of a PUSCH from the UE; and the at least one rule dictates that the DRX cycle be extended to allow for the retransmission of the PUSCH.

Clause 4: The method of Clause 2, wherein: the cell discontinuous communication cycle comprises a DTX cycle; the transmission comprises a retransmission of a PDSCH from the network entity; and the at least one rule dictates that the DTX cycle be extended to allow for the retransmission of the PDSCH.

Clause 5: The method of Clause 2, further comprising receiving an indication of whether or not the cell discontinuous communication cycle is extendable.

Clause 6: The method of Clause 5, wherein the indication is received via DCI scheduling an uplink transmission, a DCI scheduling a downlink transmission, or a non-scheduling DCI.

Clause 7: The method of Clause 5, wherein the indication is received via physical layer signaling, MAC-CE signaling, or RRC signaling.

Clause 8: The method of Clause 5, wherein the indication also indicates that the cell discontinuous communication cycle is extendable for processing certain LCGs, LCPs, or QoSs.

Clause 9: The method of Clause 2, further comprising receiving an indication of how long to extend the cell discontinuous communication cycle.

Clause 10: The method of Clause 9, wherein the indication is received via physical layer signaling, MAC-CE signaling, or RRC signaling.

Clause 11: The method of Clause 9, wherein the indication is received as at least one of a configured RTT timer value, a configured retransmission timer value, or one or more offset values.

Clause 12: The method of Clause 2, further comprising: transmitting a status report to the network entity; and determining how long to extend the cell discontinuous communication cycle based, at least in part, on the status report.

Clause 13: The method of Clause 2, wherein: the cell discontinuous communication cycle comprises a DTX cycle; the transmission comprises a retransmission of a PDSCH from the network entity; and the at least one rule dictates how to monitor for the retransmission of the PDSCH when a retransmission timer starts within an active DTX time.

Clause 14: The method of any one of Clauses 1-12, wherein the at least one rule dictates that at least one of a RTT timer value or retransmission timer value be dynamically updated to allow for processing the transmission.

Clause 15: The method of Clause 13, further comprising receiving an indication of how to dynamically update the RTT timer value or the retransmission timer value.

Clause 16: The method of Clause 14, wherein the indication is received via physical layer signaling, MAC-CE signaling, or RRC signaling.

Clause 17: The method of any one of Clauses 1-16, further comprising determining at least one of: the at least one rule to apply; or how to apply the at least one rule.

Clause 18: The method of Clause 17, wherein the determination is based on at least one of: signaling from the network entity; or a function of data involved in the transmission.

Clause 19: A method for wireless communication by a network entity, comprising: determining that a cell discontinuous communication cycle does not align with a transmission configuration for a transmission to or from a UE; and processing the transmission, based on at least one rule that adjusts at least one of the cell discontinuous communication cycle or the transmission configuration, in response to the determination.

Clause 20: The method of Clause 19, wherein the at least one rule dictates that the cell discontinuous communication cycle be extended to allow for processing the transmission.

Clause 21: The method of Clause 20, wherein: the cell discontinuous communication cycle comprises a DRX cycle; the transmission comprises a retransmission of a PUSCH from the UE; and the at least one rule dictates that the DRX cycle be extended to allow for the retransmission of the PUSCH.

Clause 22: The method of Clause 20, wherein: the cell discontinuous communication cycle comprises a DTX cycle; the transmission comprises a retransmission of a PDSCH from the network entity; and the at least one rule dictates that the DTX cycle be extended to allow for the retransmission of the PDSCH.

Clause 23: The method of Clause 20, further comprising transmitting, to the UE, an indication of whether or not the cell discontinuous communication cycle is extendable.

Clause 24: The method of Clause 23, wherein the indication is transmitted via DCI scheduling an uplink transmission, a DCI scheduling a downlink transmission, or a non-scheduling DCI.

Clause 25: The method of Clause 23, wherein the indication is transmitted via physical layer signaling, MAC-CE signaling, or RRC signaling.

Clause 26: The method of Clause 23, wherein the indication also indicates that the cell discontinuous communication cycle is extendable for processing certain LCGs, LCPs, or QoSs.

Clause 27: The method of Clause 20, further comprising transmitting, to the UE, an indication of how long to extend the cell discontinuous communication cycle.

Clause 28: The method of Clause 27, wherein the indication is transmitted via physical layer signaling, MAC-CE signaling, or RRC signaling.

Clause 29: The method of Clause 27, wherein the indication is transmitted as at least one of a configured RTT timer value, a configured retransmission timer value, or one or more offset values.

Clause 30: The method of Clause 20, further comprising: receiving a status report from the UE; and determining how long to extend the cell discontinuous communication cycle based, at least in part, on the status report.

Clause 31: The method of Clause 20, wherein: the cell discontinuous communication cycle comprises a DTX cycle; the transmission comprises a retransmission of a PDSCH from the network entity; and the at least one rule dictates how to determine a window for the retransmission of the PDSCH when a retransmission timer starts within an active DTX time.

Clause 32: The method of any one of Clauses 19-30, wherein the at least one rule dictates that at least one of a RTT timer value or retransmission timer value be dynamically updated to allow for processing the transmission.

Clause 33: The method of Clause 31, further comprising transmitting, to the UE, an indication of how to dynamically update the RTT timer value or the retransmission timer value.

Clause 34: The method of Clause 32, wherein the indication is transmitted via physical layer signaling, MAC-CE signaling, or RRC signaling.

Clause 35: The method of any one of Clauses 19-34, further comprising determining at least one of: the at least one rule to apply; or how to apply the at least one rule.

Clause 36: The method of Clause 35, wherein the determination is based on at least one of: signaling from the network entity; or a function of data involved in the transmission.

Clause 37: An apparatus, comprising: a memory comprising executable instructions; and a processor configured to execute the executable instructions and cause the apparatus to perform a method in accordance with any one of Clauses 1-36.

Clause 38: An apparatus, comprising means for performing a method in accordance with any one of Clauses 1-36.

Clause 39: A non-transitory computer-readable medium comprising executable instructions that, when executed by a processor of an apparatus, cause the apparatus to perform a method in accordance with any one of Clauses 1-36.

Clause 40: A computer program product embodied on a computer-readable storage medium comprising code for performing a method in accordance with any one of Clauses 1-36.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication by a user-equipment (UE), comprising: one or more memories comprising instructions; and one or more processors, individually or collectively, configured to execute the instructions to cause the apparatus to:

determine that a cell discontinuous communication cycle does not align with a transmission configuration for a transmission to or from a network entity, wherein the transmission comprises at least one of a retransmission of an uplink transmission or a retransmission of a downlink transmission; and process the transmission, based on at least one rule that adjusts the cell discontinuous communication cycle based on at least a delay status report of the UE and lower-layer priority information associated with the transmission to align with the transmission configuration, in response to the determination.

2. The apparatus of claim 1, wherein the at least one rule dictates that the cell discontinuous communication cycle be extended to allow for processing the transmission.

3. The apparatus of claim 2, wherein:

the cell discontinuous communication cycle comprises a discontinuous reception (DRX) cycle;

the transmission comprises a retransmission of a physical uplink shared channel (PUSCH) from the UE; and the at least one rule dictates that the DRX cycle be extended to allow for the retransmission of the PUSCH.

4. The apparatus of claim 2, wherein:

the cell discontinuous communication cycle comprises a discontinuous transmission (DTX) cycle;

the transmission comprises a retransmission of a physical downlink shared channel (PDSCH) from the network entity; and the at least one rule dictates that the DTX cycle be extended to allow for the retransmission of the PDSCH.

5. The apparatus of claim 2, wherein receiving an indication of whether or not the cell discontinuous communication cycle is extendable.

6. The apparatus of claim 5, wherein the indication is received via downlink control information (DCI) scheduling an uplink transmission, a DCI scheduling a downlink transmission, a non-scheduling DCI, physical layer signaling, medium access control (MAC) control element (CE) signaling, or radio resource control (RRC) signaling.

7. The apparatus of claim 5, wherein the indication also indicates that the cell discontinuous communication cycle is extendable for processing certain logical channel groups (LCGs), logical channel prioritizations (LCPs), or quality of services (QoSs).

8. The apparatus of claim 2, wherein the one or more processors, individually or collectively, are further configured to execute the instructions and cause the apparatus to receive an indication of how long to extend the cell discontinuous communication cycle.

9. The apparatus of claim 8, wherein the indication is received, via physical layer signaling, medium access control (MAC) control element (CE) signaling, or radio resource control (RRC) signaling, as at least one of a configured round-trip time (RTT) timer value, a configured retransmission timer value, or one or more offset values.

10. The apparatus of claim 2, wherein the one or more processors, individually or collectively, are further configured to execute the instructions and cause the apparatus to:

transmit a status report to the network entity; and determine how long to extend the cell discontinuous communication cycle based, at least in part, on the status report.

11. The apparatus of claim 1, wherein the one or more processors, individually or collectively, are further configured to execute the instructions and cause the apparatus to receive an indication of how to dynamically update a round-trip time (RTT) timer value or a retransmission timer value.

12. The apparatus of claim 1, wherein the at least one rule dictates that at least one of a round trip time (RTT) timer value or retransmission timer value be dynamically updated to allow for processing the transmission, wherein the indication is received via physical layer signaling, medium access control (MAC) control element (CE) signaling, or radio resource control (RRC) signaling.

13. The apparatus of claim 2, wherein:

the cell discontinuous communication cycle comprises a discontinuous transmission (DTX) cycle;

the transmission comprises a retransmission of a physical downlink shared channel (PDSCH) from the network entity; and the at least one rule dictates how to monitor for the retransmission of the PDSCH when a retransmission timer starts within an active DTX time.

14. The apparatus of claim 1, wherein the one or more processors, individually or collectively, are further configured execute the instructions and cause the apparatus to determine at least one of:

the at least one rule to apply; or how to apply the at least one rule.

15. The apparatus of claim 14, wherein the determination is based on at least one of:

signaling from the network entity; or a function of data involved in the transmission.

16. An apparatus for wireless communication by a network entity, comprising:

one or more memories comprising instructions; and one or more processors, individually or collectively, configured to execute the instructions to cause the apparatus to:

determine that a cell discontinuous communication cycle does not align with a transmission configuration for a transmission to or from a user equipment (UE), wherein the transmission comprises at least one of a retransmission of an uplink transmission or a retransmission of a downlink transmission; and process the transmission, based on at least one rule that adjusts the cell discontinuous communication cycle based on at least a delay status report of the UE and lower-layer priority information associated with the transmission to align with the transmission configuration, in response to the determination.

17. The apparatus of claim 16, wherein the at least one rule dictates that the cell discontinuous communication cycle be extended to allow for processing the transmission.

18. The apparatus of claim 17, wherein:

the cell discontinuous communication cycle comprises a discontinuous reception (DRX) cycle;

the transmission comprises a retransmission of a physical uplink shared channel (PUSCH) from the UE; and the at least one rule dictates that the DRX cycle be extended to allow for the retransmission of the PUSCH.

19. The apparatus of claim 17, wherein:

the cell discontinuous communication cycle comprises a discontinuous transmission (DTX) cycle;

the transmission comprises a retransmission of a physical downlink shared channel (PDSCH) from the network entity; and the at least one rule dictates that the DTX cycle be extended to allow for the retransmission of the PDSCH.

20. The apparatus of claim 17, wherein the one or more processors, individually or collectively, are further configured to execute the instructions and cause the apparatus to transmit, to the UE, an indication of whether or not the cell discontinuous communication cycle is extendable.

21. The apparatus of claim 20, wherein the indication is transmitted via downlink control information (DCI) scheduling an uplink transmission, a DCI scheduling a downlink transmission, a non-scheduling DCI, physical layer signaling, medium access control (MAC) control element (CE) signaling, or radio resource control (RRC) signaling.

22. The apparatus of claim 20, wherein the indication also indicates that the cell discontinuous communication cycle is extendable for processing certain logical channel groups (LCGs), logical channel prioritizations (LCPs), or quality of services (QoSs).

23. The apparatus of claim 17, wherein the one or more processors, individually or collectively, are further configured to execute the instructions and cause the apparatus to transmit, to the UE, an indication of how long to extend the cell discontinuous communication cycle.

24. The apparatus of claim 23, wherein the indication is transmitted, via physical layer signaling, medium access control (MAC) control element (CE) signaling, or radio resource control (RRC) signaling, as at least one of a configured round-trip time (RTT) timer value, a configured retransmission timer value, or one or more offset values.

25. The apparatus of claim 17, wherein the one or more processors, individually or collectively, are further configured to execute the instructions and cause the apparatus to:

receive a status report from the UE; and determine how long to extend the cell discontinuous communication cycle based, at least in part, on the status report.

26. The apparatus of claim 16, the one or more processors, individually or collectively, are further configured to execute the instructions and cause the apparatus to transmit, to the UE, an indication of how to dynamically update a round-trip time (RTT) timer value or a retransmission timer value.

27. The apparatus of claim 16, wherein the at least one rule dictates that at least one of the RTT timer value or the retransmission timer value be dynamically updated to allow for processing the transmission, wherein the indication is transmitted via physical layer signaling, medium access control (MAC) control element (CE) signaling, or radio resource control (RRC) signaling.

28. The apparatus of claim 17, wherein:

the cell discontinuous communication cycle comprises a discontinuous transmission (DTX) cycle;

the transmission comprises a retransmission of a physical downlink shared channel (PDSCH) from the network entity; and the at least one rule dictates how to determine a window for the retransmission of the PDSCH when a retransmission timer starts within an active DTX time.

29. A method for wireless communication by a user-equipment (UE), comprising:

determining that a cell discontinuous communication cycle does not align with a transmission configuration for a transmission to or from a network entity, wherein the transmission comprises at least one of a retransmission of an uplink transmission or a retransmission of a downlink transmission; and processing the transmission, based on at least one rule that adjusts the cell discontinuous communication cycle based on at least a delay status report of the UE and lower-layer priority information associated with the transmission to align with the transmission configuration, in response to the determination.

30. A method for wireless communication by a network entity, comprising:

determining that a cell discontinuous communication cycle does not align with a transmission configuration for a transmission to or from a user equipment (UE), wherein the transmission comprises at least one of a retransmission of an uplink transmission or a retransmission of a downlink transmission; and processing the transmission, based on at least one rule that adjusts the cell discontinuous communication cycle based on at least a delay status report of the UE and lower-layer priority information associated with the transmission to align with the transmission configuration, in response to the determination.

* * * * *